US008262064B2

(12) United States Patent
Knestel et al.

(10) Patent No.: US 8,262,064 B2
(45) Date of Patent: Sep. 11, 2012

(54) LIFTING DEVICE

(75) Inventors: Anton Knestel, Hopferbach (DE); Engelbert Keseberg, Kempten (DE)

(73) Assignee: Maha Maschinenbau Haldenwang GmbH & Co. KG, Haldenwang (DE)

( * ) Notice: Subject to any disclaimer, the term of this patent is extended or adjusted under 35 U.S.C. 154(b) by 422 days.

(21) Appl. No.: 12/385,703

(22) Filed: Apr. 16, 2009

(65) Prior Publication Data

US 2009/0271041 A1 Oct. 29, 2009

(30) Foreign Application Priority Data

Apr. 28, 2008 (DE) ......................... 10 2008 021 149

(51) Int. Cl.
*B66F 3/22* (2006.01)
*B66F 3/24* (2006.01)
*B60P 1/48* (2006.01)
*A62B 3/00* (2006.01)
*E21D 15/44* (2006.01)
*G01B 3/14* (2006.01)
*G05D 15/01* (2006.01)

(52) U.S. Cl. ....... 254/122; 254/8 C; 254/9 C; 254/93 R; 33/193

(58) Field of Classification Search .................. 254/122, 254/8 C, 9 C, 93 R, 89 H; 33/193, 203.18
See application file for complete search history.

(56) References Cited

U.S. PATENT DOCUMENTS 3,891,108 A * 6/1975 Traficant ......................... 254/45
4,221,280 A * 9/1980 Richards ....................... 187/269
4,447,042 A * 5/1984 Masui ............................ 254/90
4,573,663 A * 3/1986 Nussbaum .................. 254/89 H
4,741,512 A * 5/1988 Elkuch et al. ................. 254/9 C
5,024,141 A 6/1991 Kawada
5,058,286 A * 10/1991 Chisum ........................... 33/608
5,322,143 A * 6/1994 Curran .......................... 187/211
5,695,173 A * 12/1997 Ochoa et al. .................. 254/122
5,967,494 A * 10/1999 Fiorese ......................... 254/122
6,189,432 B1 2/2001 Colarelli et al.
6,241,049 B1 * 6/2001 Gooch .......................... 187/285
6,729,032 B2 * 5/2004 Granata .......................... 33/193
2007/0119658 A1 5/2007 Nussbaum
2010/0243973 A1 9/2010 Deuring et al.

FOREIGN PATENT DOCUMENTS

DE 3240952 A1 5/1984
DE 3336713 A1 4/1985
DE 3439292 A1 5/1986
DE 10 2005 000 883 A1 7/2006
DE 20 2006 014 183 U1 12/2006
DE 20 2006 014 101 U1 2/2007
DE 20 2005 016 467 U1 4/2007
WO WO 95/11189 4/1995
WO WO 2008/141624 A1 11/2008

* cited by examiner

*Primary Examiner* — Lee D Wilson
*Assistant Examiner* — Alvin Grant
(74) *Attorney, Agent, or Firm* — Oliff & Berridge, PLC

(57) ABSTRACT

The invention relates to a lifting device for lifting objects, such as motor vehicles, comprising at least one main lifting unit (22, 23), at least one additional lifting unit (24, 25), the additional lifting unit (24, 25) being disposed on the main lifting unit (22, 23) in such a way that a main lifting height ($h_h$) of the lifting platform may be extended to a total lifting height ($h_g$) by using the additional lifting unit (24, 25), and comprising a control unit (200) for controlling the main lifting unit (22, 23) and the additional lifting unit (24, 25), characterized in that the control unit (200) may be switched from controlling the main lifting unit (22, 23) to controlling the additional lifting unit (24, 25) as well as from controlling the additional lifting unit (24, 25) to controlling the main lifting unit (22, 23) via corresponding actuators (18, 19, 20, 21).

19 Claims, 3 Drawing Sheets

LIFTING DEVICE

The invention relates to a lifting device for lifting objects, particularly motor vehicles, comprising a main lifting unit and an additional lifting unit, wherein a single hydraulic set comprising corresponding control members may be used in order to reduce the necessary measuring and control means for the overall lifting unit which may consist of a main lifting unit and an additional lifting unit.

Lifting devices having a main lifting unit and an additional lifting unit are known on the market. Such lifting units may on the one hand be scissors or pantograph lifting platforms, as shown e.g. in FIG. 1. However, there are also known cylinder or plunger lifting platforms which have a main lifting unit and an additional lifting unit, as described e.g. in US 2007/0119658 A1.

In all lifting devices known so far, the main lifting gear and the additional lifting gear are driven cascadedly, which results in an overall lifting height larger than the lifting heights of the individual lifting gear. Here, the main lifting gear is lifted at first and then the additional lifting gear is extended. Commercially available lifting platforms have two travel or running rails onto which a vehicle may be moved. In this case, for each running rail a respective pantograph lifting platform is used, for example, in order to guarantee sufficient accessibility to the vehicle floor. No mechanic connection members are provided between the two pantograph lifting platforms. As these pantograph lifting platforms can be lifted independently of each other, it is therefore necessary from a technical point of view to take the lifting height of the two running rails (left and right running rail) to the same level and permanently maintain them there.

In this connection, various solutions have so far been known on the market. One possibility consists of so-called master/slave systems wherein only one cylinder of e.g. the left half of the vehicle is pressurized with oil by the hydraulic set. The oil displaced in the cylinder rod chamber is connected to the piston chamber of the right half of the vehicle. Now, if the piston volume of the right half of the vehicle and the rod volume of the left half of the vehicle have the same dimension, a compulsory synchronicity of the lifting gears is achieved. Such technology is used in main lifting gears and additional lifting gears alike.

Here, the problem turns up that comparatively great cabling and piping efforts are required. Also, the electronics of the hydraulic system prove to be very difficult. Furthermore, means must be provided so that small leakages on the cylinders may be compensated.

In addition thereto, techniques are known which use an electro-hydraulic synchronization control. Here, the ways of the main lifting unit and the additional lifting unit are detected via electric measuring units. The lifting platform is supplied with oil via a so-called flow divider and a pressure regulator, respectively, the flow divider providing a rough synchronization of the two lifting platform parts. However, in case of unequal load distribution, height differences result which must be evened out. For this purpose, the signals generated by the electronic masters are compared and corresponding hydraulic actuators are driven to even out the lifting heights. The hydraulic control members, like the electrical measuring units, are respectively required for the main lifting and the additional lifting units. To this end, electric measuring units are required on the two main lifting units and the two additional lifting units. Furthermore, all controls must also be realized in duplicate.

This leads to the disadvantage that correspondingly high technical efforts are necessary and that moreover the installation of such lifting platform turns out to be correspondingly laborious.

It is the object of the invention to provide a lifting device for lifting objects, in particular vehicles, which makes do with as few measuring means and control means as possible.

This object is achieved by a device and a method comprising the features of the independent claims. The dependent claims relate to advantageous developments of the invention.

The inventive lifting device for lifting objects, particularly motor vehicles, may comprise at least one main lifting unit and/or at least one additional lifting unit. The additional lifting unit may be disposed on the main lifting unit in such a way that a main lifting height of the lifting platform may be extended to a total lifting height by using the additional lifting unit. Furthermore, a control unit may be provided which is characterized in that both the main lifting unit and the additional lifting unit may be driven by the control unit. Moreover, at least one main control element and at least one additional control element may be provided, the main control element and the additional control element being switchable in dependence upon each other in such a manner that alternatively only the main control element or the additional control element is transferable into an active or activated state. By using a single control unit for both lifting units, it is possible to reduce the cabling efforts in a particularly simple manner and thus the accessibility beneath an object to be lifted may be improved. Moreover, the advantage results that the number of components may be reduced. Furthermore, a measuring unit may be provided by means of which the total lifting height resulting from the sum of the main lifting height of the main lifting unit and the lifting height of the additional lifting unit are jointly determinable. For this reason, it is possible to further reduce the number of components used.

In this case, the control unit may be a control unit and/or controller and the main control elements and additional control elements may be in the shape of seat valves.

The lifting units may be operated hydraulically and/or electrically. The lifting units and the lifting device, respectively, may be subsurface platforms comprising plungers or cylinders, column lifting platforms, each possibly also comprising a telescopic operation, and/or swiveling lifting platforms.

Furthermore, the main control element may be transferable into an open or active state in which the main lifting unit may be driven, and into a closed or inactive state in which the main lifting unit cannot be driven, and/or the additional control element may be transferable into an open or active state in which the additional lifting unit may be driven, and into a closed or inactive state in which the additional lifting unit cannot be driven, wherein, when the main control element is in an open or active state, the additional control element is only transferable into a closed or inactive state, and/or when the additional control element is in an open or active state, the main control element is only transferable into a closed or inactive state. Thus, it can be ensured that the individual lifting units cannot be operated at the same time and thus the risk of an erroneous detection of synchronization by the control unit is excluded although the lifting units perform uneven lifting movements.

In one embodiment the lifting device may be hydraulically operated. In this case the control unit may for example be a hydraulic control unit having a flow distributor or divider and two by-pass valves wherein alternatively a synchronization control of the main lifting units or the additional lifting units may be performed by means of the control unit.

Furthermore, if a lifting difference exceeds a first limiting value, a by-pass valve of the respective higher main lifting unit and/or additional lifting unit may be transferable into an opened state for a limited time. Thus, the advantage results that slight lifting differences can be compensated between the respective lifting units of a running rail with respect to the other running rail without interrupting the lifting movement of the lifting platform.

Moreover, if the lifting difference exceeds a second limiting value, a first lock valve may be transferable into a closed state in addition to opening the by-pass valve. Thus, a lifting difference between the lifting units can be compensated in a particularly simple manner, the compensation being achieved faster than in the case that only the by-pass valve of the respective higher lifting unit is opened for a limited time.

Furthermore, if the lifting difference exceeds a second limiting value, a second lock valve may be transferable into a closed state in addition to opening the by-pass valve. Thus, the advantage results that if a lifting difference occurs, this lifting difference may be compensated by using the main lifting unit as well as the additional lifting unit.

Moreover, if the lifting difference exceeds a maximum value, the lifting device can be shut down by the fact that all lock valves are transferable into a closed state and a pumping set can be put out of operation. This offers the advantage that in case an inadmissible lifting difference between the lifting platforms occurs, the entire system can be switched off, while it can be ensured that an object located on the lifting unit, such as, for example, a motor vehicle, can be prevented from falling off.

Furthermore, the lifting device may be characterized in that at least one measuring unit per lifting member is provided, the lifting member possibly comprising a main lifting unit connected to at least one additional lifting unit, wherein a total lifting height resulting from the sum of the lifting height of the main lifting unit and the lifting height of the additional lifting unit may be jointly determinable. Thus, the advantage results that the number of components may be further reduced because it is only the position of the additional lifting units to each other that is exclusively decisive for the safe support of the object to be lifted. If the additional lifting unit is not used but the motor vehicle is lifted only by the main lifting unit, the additional lifting unit is respectively positioned on the main lifting unit and can provide information on the height of the main lifting unit by measuring the distance from the floor surface to the additional lifting unit. Thus, it is no longer necessary to provide additional sensors on the main lifting units.

Moreover, the lifting device may be characterized in that the measuring unit is formed by a contact-free measuring means and that the lifting height between a floor surface and the additional lifting unit is detected whereby the total lifting height of the lifting platform is directly determinable.

Furthermore, the lifting device can be characterized in that the measuring unit is formed by a cable pull sensor, the cable pull sensor being attached to the floor and a pull-out cable being connected to the additional lifting unit.

Furthermore, a lifting device may be characterized in that the measuring unit is formed by a cable pull sensor, the cable pull sensor being attached to the additional lifting unit and the pull-out cable being connected to the floor.

Moreover, the lifting device may be provided for lifting objects, particularly motor vehicles, which comprises at least one main lifting unit and/or at least one additional lifting unit. In this case, the additional lifting unit may be disposed on the main lifting unit in such a way that a main lifting height of the lifting platform is extendable by using the additional lifting unit to a total lifting height. Furthermore, control means may be provided for controlling the main lifting unit and the additional lifting unit. Furthermore, at least one measuring unit may be provided with which a total lifting height resulting from the sum of the main lifting height of the main lifting unit and the lifting height of the additional lifting unit is jointly determinable.

Moreover, the control means may be hydraulic control units each comprising a flow distributor or divider and two by-pass valves.

An inventive method for controlling a lifting unit according to the invention may comprise the following steps:

- selecting at least two main lifting units or additional lifting units to be controlled,
- controlling a lifting and/or lowering movement of the selected main lifting units or additional lifting units, wherein, if a lifting difference between the main lifting unit or the additional lifting units exceeds a first limiting value, a by-pass valve of the respective higher main lifting unit or additional lifting unit may be opened for a limited time.

Furthermore, if the lifting difference exceeds a second limiting value, a first lock valve may be closed in addition to opening the by-pass valve.

Moreover, if the lifting difference exceeds a second limiting value, a second lock valve may be closed in addition to opening the by-pass valve.

Furthermore, if the lifting difference exceeds a maximum value the lifting unit may be shut down by closing all lock valves and putting a pumping set out of operation.

Below, the invention will be explained by way of example in more detail with reference to schematic drawings wherein.

Figure 1A:
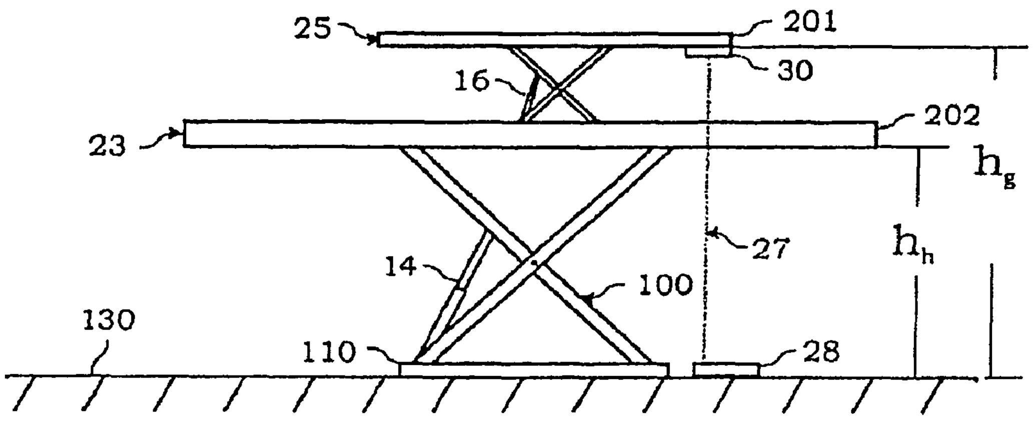
FIG. 1A shows a side view of a lifting device.
Figure 1B:
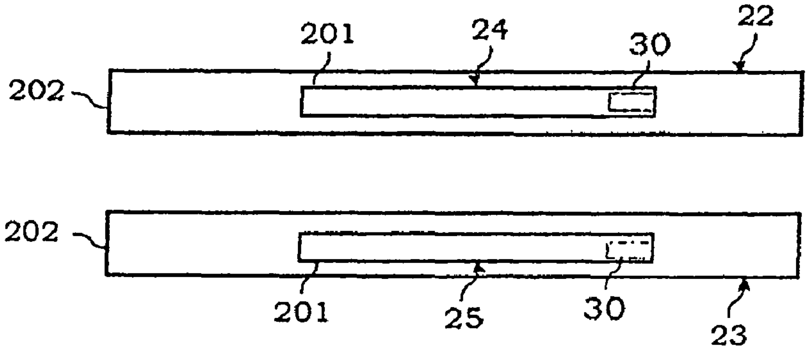
FIG. 1B shows a plan view of a lifting device.
Figure 2:
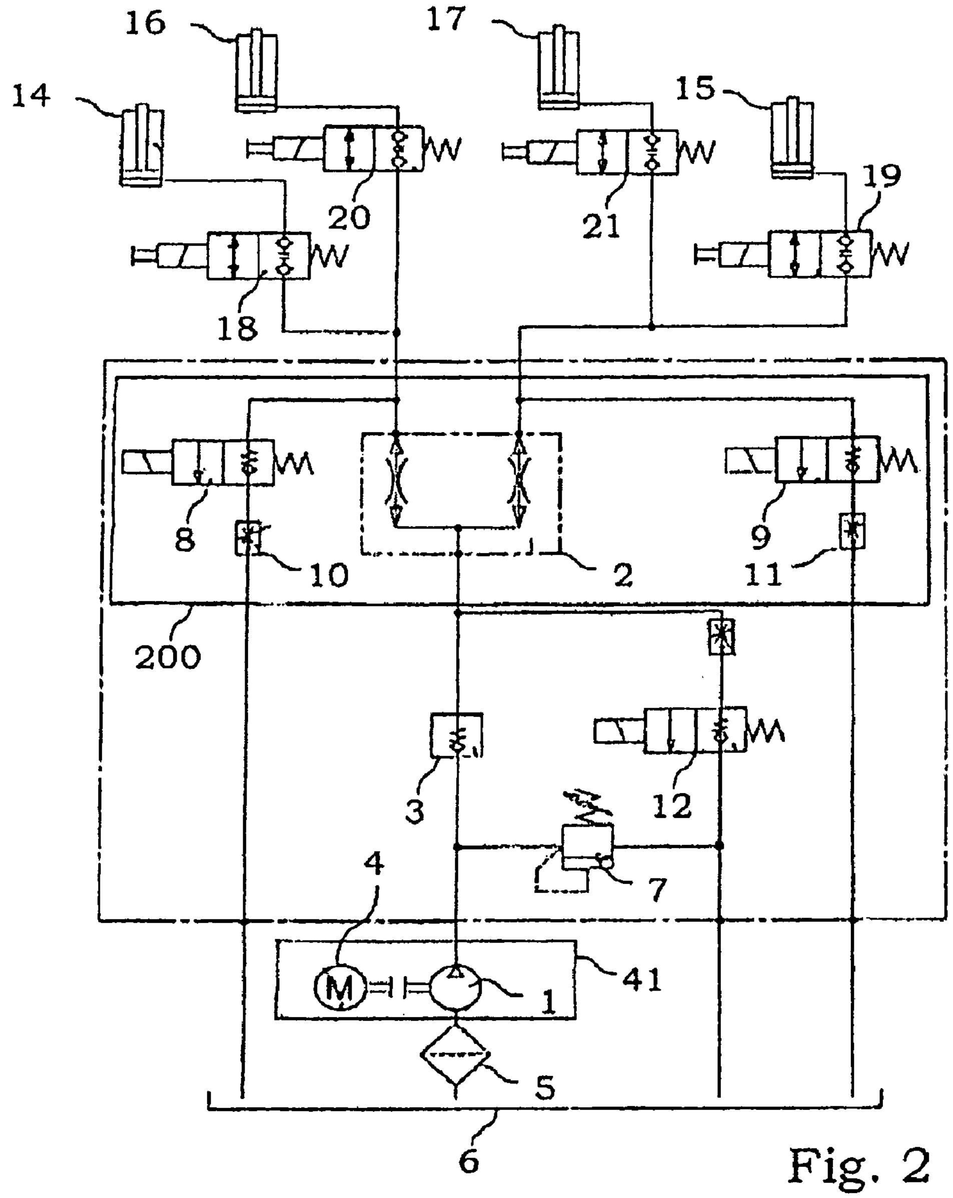
FIG. 2 shows a hydraulic plan of the lifting device.

FIGS. 1A/1B show a lifting device respectively comprising a main lifting unit 22, 23 in the form of a pantograph lifting platform. The main lifting units 22, 23 comprise a base 110 connected to a floor surface 130, for example a workshop shed. Furthermore, the main lifting units 22, 23 respectively comprise a running rail 202 and a lifting member 14, 15, the lifting members 14, 15, which are shaped in the form of hydraulic cylinders, being used to move the respective running rail 202 substantially perpendicular to the floor surface 130 via the pantograph mechanism. As shown in FIG. 1B, 2 running rails 202 are provided and accordingly one main lifting member 14, 15 is respectively provided for each running rail. The same applies to both carriers 201 for which a respective additional lifting member 16, 17 is provided (see also FIG. 2).

A respective additional lifting unit 24, 25, also in the shape of a pantograph lifting platform, may be provided on each running rail 202. The additional lifting units 24, 25 may respectively have a carrier 201 disposed substantially parallel to the running rail 202. The carrier 201 may perform a lifting movement substantially perpendicular to the floor surface 130. The lifting movement of the carrier 201 is accomplished by a respective lifting member 16, 17 in the shape of a hydraulic cylinder. The carrier 201 may be brought into contact with an underbody of a motor vehicle (not shown) in order to lift the motor vehicle to e.g. a total lifting height $h_g$.

In other embodiments of the invention, not shown, the lifting members 14, 15, 16, 17 may be in the shape of pneumatic or hydraulic cylinders, plunger or cylinders, columns and/or spindles. Furthermore, a rack operation is also conceivable.

Furthermore, schematic measuring units are shown which comprise at least one transmitting unit 28 and/or at least one receiving unit 30. A transmitting and receiving unit 28, 30 may respectively be provided for each side of the lifting unit. In this case, the transmitting unit 28 may be attached to the workshop shed floor 130, sending signals in a contact-free manner, for example, in the shape of a laser beam and/or an infrared signal to a receiving unit 30 respectively attached to a bottom side of the carrier 201 of the additional lifting unit 24, 25. Thus, a measuring distance 27 results. However, the measuring units 28, 30 for detecting the lifting height may also be in the form of an ultrasonic sensor or a cable pull. It should be explicitly mentioned here that the arrangements of the transmitting unit 28 and the receiving unit 30 may also be exchanged with each other, that is, the receiving unit 30 may be disposed on the floor surface 130 and on an unmoved part, respectively, and the transmitting unit 28 may be disposed on the carrier 201 and a moved part, respectively.

A control unit 200 (see FIG. 2) is connected to the lifting members 14, 15 of the main lifting units 22, 23 and the lifting members 16, 17 of the additional lifting units 24, 25 and may drive the lifting members 16, 17 such that the running rails 202 of the main lifting units 22, 23 move to a main lifting height $h_h$ and the carriers 201 of the additional lifting units 24, 25 move to a total lifting height $h_g$. Furthermore, the control unit 200 is connected to the transmitting unit(s) 28, the transmitting unit 28 transmitting signal data with respect to the real actual height of the main lifting units 22, 23 and of the additional lifting units 24, 25 to the control unit 200. Thus, the control unit 200 permanently detects the actual main lifting height $h_h$-actual and the actual total lifting height $h_g$-actual and permanently performs a comparison to the target main lifting height $h_h$-target and the target total lifting height $h_g$-target. Thus, the control unit 200 controls or regulates the present height of the main lifting units 22, 23 as well as of the additional lifting units 24, 25 and initiates the lifting units 22, 23, 24 and 25 in such a manner that the target position of the respective lifting unit 22, 23, 24 and 25 is reached.

FIG. 1B shows the running rails 202. Here, the running rails 202 are connected to the main lifting units 22, 23. Furthermore, the support members 201 are illustrated which are connected to the additional lifting units 24, 25. After a motor vehicle has moved onto the running rails 202, it may be lifted by the support members 201 and thus to the total lifting height. In such a position the wheels of the motor vehicle are freely suspended in the air.

FIG. 2 illustrates a hydraulic circuit diagram of the lifting device. Here, merely one hydraulic set comprising corresponding control members is used for the entire lifting device.

The oil flow generated by a hydraulic pump 1 is approximately uniformly distributed to the lifting units 22, 23, 24 and/or 25 via the flow divider 2.

A check valve 3 provides for the fact that in case of a stationary drive motor 4 the hydraulic oil cannot flow back into the tank 6 via the pump 1 and the filter 5. Furthermore, a pressure control valve (PCV) 7 is provided in order to protect the lifting units and the entire hydraulic system from overload. If a difference in the lifting height is determined by the measuring units, one of the two by-pass valves 8, 9 is opened by a control unit 200 and a part of the oil volume flow is directed back into the tank 6. In this case the compensation speed can be adjusted via throttle valves 10, 11. In order to lower the lifting platform the pumping set 41 is switched off and the lowering valve 12 is opened. The lowering speed is regulated via another throttle valve 13. If a difference in the lifting height is detected during the lowering process, the by-pass valves 8, 9 are opened and an additional amount of oil is discharged on the side of the lifting unit having the greater height.

In another suitable embodiment of the invention the hydraulic set (control unit and/or controller) 200 is used to drive the lifting members 14, 15. When the main lifting unit 22, 23 is to be lifted or lowered, both seat valves 18, 19 are opened.

If, on the other hand, the additional lifting units 24, 25 are to be moved, the seat valves 20, 21 are opened and the cylinders 16, 17 are connected to the controller 200. The control valves 8, 9 as well as the flow divider 2 are likewise responsible for the main lifting units 22, 23 and the additional lifting units 24, 25.

The electric measuring units 28, 30 may for example be designed as an ultrasonic measuring unit and/or a cable transducer. To this end, they are arranged such that not only the lifting height of the main lifting unit 22, 23 or additional lifting unit 24, 25 is measured but also the sum of the heights of a main lifting unit 22, 23 with the additional lifting unit 24, 25 attached thereto. In the control unit 200 counting mechanisms for the lifting heights of the main and additional lifting units are separated from each other by assigning the change in the lifting height of the respective lifting unit in accordance with the valve position of the main actuators 18, 19 and the additional actuators 20, 21.

Furthermore, operating members (not shown) are provided for operating the lifting device. For this purpose, an operating member for lifting and another operating member for lowering the respective lifting unit 22, 23, 24, 25 is respectively provided for the main lifting units 22, 23 and for the additional lifting units 24, 25. By operating the respective lifting or lowering operating member of the main lifting unit 22, 23, two substantially parallel main lifting units 22, 23 are simultaneously made to perform a lifting or lowering movement. Likewise, by operating the respective lifting or lowering operating members for the additional lifting unit 24, 25, two substantially parallel additional lifting units 24, 25 are made to perform a lifting or lowering movement. If the control unit 200 for controlling a main lifting unit 22, 23 is activated and an operating member for operating the additional lifting unit 24, 25 is operated, the control unit 200 is switched over to the additional lifting unit 24, 25. An analogue switch-over takes place when as a final step an additional lifting unit 24, 25 was controlled by the control unit 200 and an operating member of the main lifting unit 22, 23 is operated.

Figure 3:
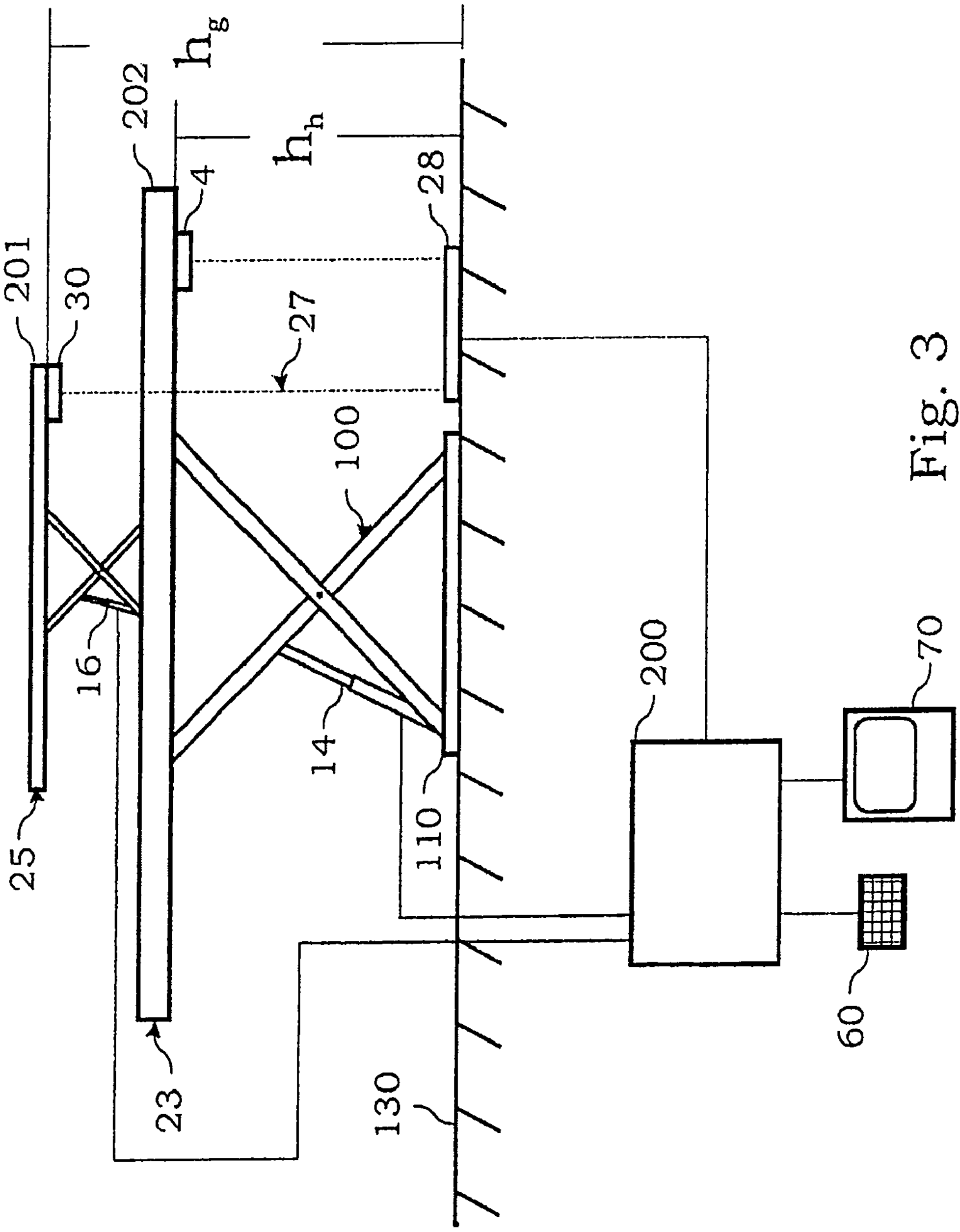
FIG. 3 shows a further view of the lifting device.

The control unit 200 may be connected to an input unit 60 which is shown in FIG. 3 as an example and not in a limiting way as a keyboard via which the user may enter the above-mentioned target positions of the main lifting unit 22, 23 and the additional lifting unit 24, 25.

Furthermore, the control unit 200 is connected to a display unit 70 which is capable of indicating data with respect to the target lifting height values of the main lifting height as well as the total lifting height and data of the actual height of the main lifting unit 22, 23 as well as the additional lifting unit 24, 25.

In another embodiment not shown, the main lifting unit 22, 23 as well as the additional lifting unit 24, 25 may respectively be in the form of a column lifting platform or plunger lifting platform and/or consist of a combination of column lifting platforms, plunger lifting platforms and/or pantograph lifting platforms.

The above-mentioned features and exemplarily described embodiments of the present invention may arbitrarily be combined with each other in part or as a whole to form further embodiments adapted to corresponding applications of the invention. As far as such embodiments result from the above-mentioned embodiment examples for a person skilled in the art, they are to be considered as implicitly disclosed by the above embodiment examples.

We claim:

1. A lifting device for motor vehicles, comprising:

at least two main lifting units, at least two additional lifting units, one of the at least two additional lifting units being disposed on one of the at least two main lifting units in such a way that by using one of the at least two additional lifting units a main lifting height of the lifting platform may be extended to a total lifting height, a control unit, and at least two measuring units for determining lifting heights, wherein both one of the at least two main lifting units and one of the at least two additional lifting units can be driven by the control unit, wherein at least one main control element and at least one additional control element is provided, the main control element and the additional control element being switchable in dependence upon each other in such a manner that alternatively only the main control element or the additional control element may respectively be transferred into an active state, wherein the control unit has a flow divider and a plurality of by-pass valves, wherein if a lifting difference is determined, one of the plurality of by-pass valves is opened by the control unit to discharge a part of an oil volume directly into an oil reservoir from a side having a greater height, and wherein the control unit comprises a synchronization control of the at least two main lifting units and of the at least two additional lifting units, and synchronization control of the at least two main lifting units or of the at least two additional lifting units may alternatively be performed by means of the control unit.

2. The lifting device according to claim 1, wherein at least one measuring unit is provided by means of which the total lifting height resulting from the sum of the main lifting height of one of the at least two main lifting units and the lifting height of one of the at least two additional lifting units is jointly determinable.

3. The lifting device according to claim 1, wherein the main control element and/or the additional control element is a hydraulic and/or electrical actuator, the respective associated lifting unit being operable hydraulically or electrically.

4. The lifting device according to claim 1, wherein the main control element is transferable into an open state, in which one of the at least two main lifting units can be driven, and into a closed state in which one of the at least two main lifting units cannot be driven, and that the additional control element is transferable into an open state in which one of the at least two additional lifting units can be driven, and into a closed state in which one of the at least two additional lifting units cannot be driven, wherein, when the main control element is transferable into an open state, the additional control element is only transferable into a closed state, and when the additional control element is transferable into an open state, the main control element is only transferable into a closed state.

5. The lifting device according to claim 1, wherein if a lifting difference exceeds a first limiting value, a by-pass valve of the respective higher of one of the at least two main lifting units and/or one of the at least two additional lifting units is transferable into an opened state for a limited time.

6. The lifting device according to claim 1, wherein if a lifting difference exceeds a second limiting value, a first lock valve is transferable into a closed state in addition to opening the by-pass valve .

7. The lifting device according to claim 1, wherein if a lifting difference exceeds a second limiting value, a second lock valve is transferable into a closed state in addition to opening the by-pass valve.

8. The lifting device according to claim 1, wherein if a lifting difference exceeds a maximum value, one of the at least two main lifting units and one of the at least two additional lifting units may be shut down in that all lock valves are transferable into a closed state and a pumping set may be put out of operation.

9. The lifting device according to claim 1, wherein at least one measuring unit per lifting member is provided wherein the lifting member comprises one of the at least two main lifting units connected to one of the at least two additional lifting units, a total lifting height resulting from the sum of the main lifting height of one of the at least two main lifting units and the lifting height of one of the at least two additional lifting units being jointly determinable by means of the measuring unit.

10. The lifting device according to claim 1, wherein the measuring unit consists of a contact-free measuring means and that the lifting height between a floor surface on which the lifting device is located and one of the at least two additional lifting units can be measured whereby the total lifting height of the lifting platform is directly determinable.

11. The lifting device according to claim 1, wherein the measuring unit consists of a cable pull sensor, the cable pull sensor being fixed to the floor, and a pull-out cable is connected to one of the at least two additional lifting units.

12. The lifting device according to claim 1, wherein the measuring unit consists of a cable pull sensor, the cable pull sensor being fixed to one of the at least two additional lifting units and the pull-out cable being connected to the floor.

13. The lifting device according to claim 12, wherein the control means are hydraulic control units each having the flow divider and two by-pass valves.

14. The lifting device according to claim 1, further comprising:

a pump, at least two main control elements, at least two additional control elements, wherein the flow divider is disposed between the pump and the at least two main control elements and/or the at least two additional control elements, the flow divider equally distributing oil to each of the at least two main control elements or, alternatively, to each of the at least two additional control elements.

15. A lifting device for lifting objects, comprising:

at least two main lifting units, at least two additional lifting units, one of the at least two additional lifting units being disposed on one of the at least two main lifting units in such a way that by using one of the at least two additional lifting units a main lifting height of the lifting platform may be extended to a total lifting height, control means, and at least two measuring units for determining lifting heights, wherein at least one measuring unit is provided by means of which a total lifting height resulting from the sum of the main lifting height of one of the at least two main lifting units and the lifting height of one of the at least two additional lifting units is jointly determinable, wherein the control means has a flow divider and a plurality of by-pass valves, and wherein if a lifting difference is determined, one of the plurality of by-pass valves is opened by the control unit to discharge a part of an oil volume directly into an oil reservoir from a side having a greater height, and wherein the control unit comprises a synchronization control of the at least two main lifting units and of the at least two additional lifting units, and synchronization control of the at least two main lifting units or of the at least two additional lifting units may alternatively be performed by means of the control unit.

16. A method for controlling a lifting device according to claim 1, comprising the following steps:

selecting at least two main lifting units or additional lifting units to be controlled, controlling a lifting and/or lowering movement of the selected at least two main lifting units or additional lifting units, wherein, if a lifting difference between one of the at least two main lifting units or one of the at least two additional lifting units exceeds a first limiting value, the by-pass valve of the respective higher one of the at least two main lifting units or one of the at least two additional lifting units may be opened for a limited time and a part of an oil volume is, thereby, dischargeable directly into an oil reservoir.

17. The method according to claim 16, wherein, if the lifting difference exceeds a second limiting value, a first lock valve may be closed in addition to opening the by-pass valve.

18. The method according to claim 16 , wherein, if the lifting difference exceeds a second limiting value, a second lock valve may be closed in addition to opening the by-pass valve.

19. The method according to claim 16, wherein one of the at least two main lifting units and one of the at least two additional lifting units may be shut down if the lifting difference exceeds a maximum value by closing all lock valves and putting a pumping set out of operation.

* * * * *